United States Patent [19]

Acampora et al.

[11] Patent Number: 4,730,310

[45] Date of Patent: Mar. 8, 1988

[54] TERRESTRIAL COMMUNICATIONS SYSTEM

[75] Inventors: Anthony Acampora, Freehold; Ta-Shing Chu, Lincroft; Corrado Dragone, Little Silver; Michael J. Gans, Monmouth Beach, all of N.J.

[73] Assignees: American Telephone and Telegraph Company, New York, N.Y.; Bell Telephone Laboratories, Incorporated, Murray Hill, N.J.

[21] Appl. No.: 843,842

[22] Filed: Mar. 26, 1986

Related U.S. Application Data

[63] Continuation-in-part of Ser. No. 729,915, May 3, 1985, abandoned.

[51] Int. Cl.$^4$ .............................. H04J 3/16; H01J 5/18
[52] U.S. Cl. ......................................... 370/95; 455/33; 379/60; 342/361; 340/825.8
[58] Field of Search ...................... 370/95, 104, 59, 63, 370/93; 455/33; 340/825.79, 825.8; 379/59, 60; 343/373, 361

[56] References Cited

U.S. PATENT DOCUMENTS

| 4,092,600 | 5/1978 | Zimmerman et al. | 379/59 |
| 4,232,266 | 11/1980 | Acampora | 370/79 |
| 4,252,999 | 2/1981 | Acampora et al. | 370/104 |
| 4,315,262 | 2/1982 | Acampora et al. | 343/100 |
| 4,513,412 | 4/1985 | Cox | 455/33 |
| 4,578,815 | 3/1986 | Persinotti | 455/33 |
| 4,633,463 | 12/1986 | Mack | 455/33 |

OTHER PUBLICATIONS

S. A. Mohamed et al, "29 GHz point-to-point radio systems for local distribution", Br Telecom Technol J, vol. 2, No. 1, Jan. 1984, pp. 29-40.

J. W. Ballance, "A Low-Cost TDM/TDMA Subsystem for Point-to-Multipoint Local Distribution", Br Telecom Technol J, vol. 2, No. 2, Apr. 1984.

R. P. Scott, "A Low Cost 19 GHz Radio Sub-System for Point-to-Multipoint Radio Applications", Br Telecom Technol J, vol. 2, No. 3, Jul. 1984, pp. 50-57.

Primary Examiner—Douglas W. Olms
Assistant Examiner—Frank M. Scutch, III
Attorney, Agent, or Firm—David R. Padnes

[57] ABSTRACT

A terrestrial radio system which utilizes spot beams, time division multiple access and frequency reuse to provide communications services from a base station to remote customers within a system service region. The base station advantageously is arranged with multistage switching so as to permit the respective sharing of radio transmitters and receivers over larger number of antenna transmitting and receiving ports.

15 Claims, 8 Drawing Figures

IMAGE OF SYSTEM SERVICE REGION

ELEVATION
AZIMUTH

SPOT BEAM FOOTPRINTS SUPERIMPOSED OVER IMAGE OF SYSTEM SERVICE REGION

TERRESTRIAL COMMUNICATIONS SYSTEM

This application is a continuation-in-part of application Ser. No. 729,915, filed May 3, 1985 now abandoned.

TECHNICAL FIELD

The present invention relates to a terrestrial radio communications system which combines the concepts of scanning spot beams, time-division-multiple-access (TDMA) and frequency reuse to provide communications services to multiple locations spread over a limited geographical area.

BACKGROUND OF THE INVENTION

Radio systems have long been used to provide trunk connections in the telecommunications network. Recently, radio systems have been devised for local distribution applications, especially in the urban environment, which supply high-capacity communications channels and can provide for new wideband services, such as video teleconferencing. While coaxial and optical fiber communications systems can also be used for such applications, the installation of cable ducts is expensive, can take years to construct and can be disruptive in a city environment. Radio systems, on the other hand, can often be more readily installed and can provide the high information carrying capacities and bandwidths required for expanding communications needs.

A variety of terrestrial radio systems for local distribution network applications have been proposed. See, for example, publications entitled "A cost-effective 19 GHz digital multipoint radio system for local distribution applications", by M. T. H. Hewitt et al., *British Telecom. Technol. Journal*, Vol. 2, No. 4, September 1984, pp. 94-101, and "29 GHz point-to-point radio systems for local distribution", by S. A. Mohamed and M. Pilgrim, *British Telecom. Technol. Journal*, Vol. 2, No. 1, January 1984, pp. 29-40. While these systems, designed for the urban environment, can provide the quick provision of broadband service in the local distribution network, they cannot accommodate the large number of system customers required in certain system applications, nor can they provide interference-free contiguous coverage. In addition, they cannot provide adequate fade margins over all portions of the available radio spectrum. Finally, for many intra-city applications, they cannot provide the very high system capacities required to satisfy the overall traffic demand.

SUMMARY OF THE INVENTION

Pursuant to the present invention, a terrestrial radio system overcomes the limitations of the prior art by combining the spot beams, TDMA and frequency reuse to provide high capacity contiguous communications services over a system service area from a base station. At the base station, each section of the service area is covered by a different one of a raster of spot beams which is switched on in accordance with a TDMA frame. In addition, a small number of transmission frequencies are reuse by different spot beams in a manner which provides efficient spectrum utilization while limiting interference between simultaneously activated spot beams. In accordance with a further aspect of the present invention, radio transceivers far smaller than the number of spot beams are effectively shared among all spot beams through the use of multistage switching apparatus.

BRIEF DESCRIPTION OF THE DRAWING

FIG. 7 is an illustrative reduction of a 4×4 traffic matrix comprising 39 units of traffic for 3 transmitters and 3 receivers each of a capacity of 13, in accordance with the present invention; and FIG. 8 is a TDMA frame assignment sequence for the exemplary reduction of FIG. 7.

DETAILED DESCRIPTION

Figure 1:
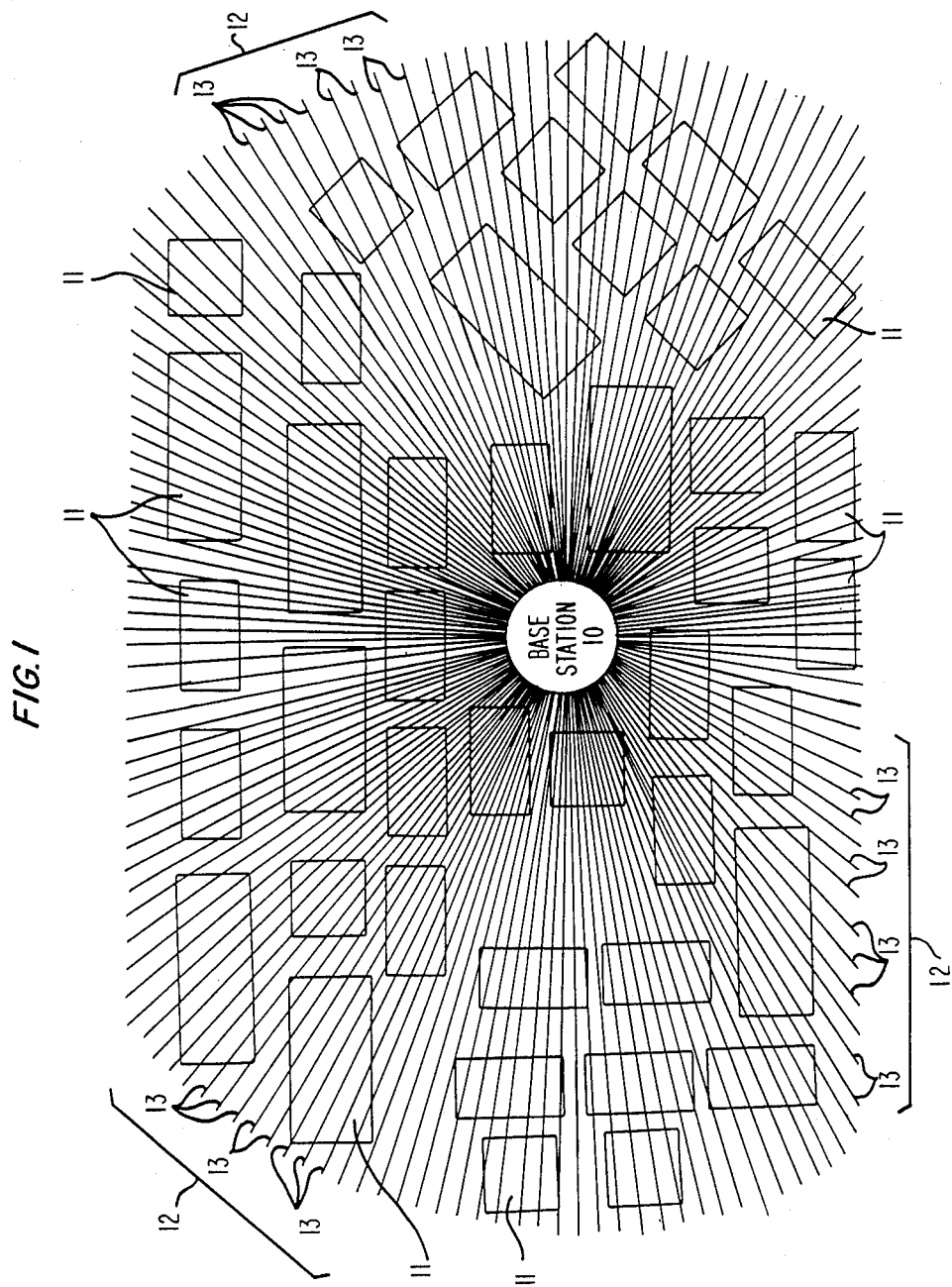
FIG. 1 is a representation of a terrestrial communications system including a base station which comunicates with customers in a system service region in accordance with the principles of the present invention.

FIG. 1 shows a terrestrial communications system 100 in accordance with the present invention. The system includes a base station 10 which provides communications services among the customers 11 within a system service region 12. Region 12 is divided into sectors 13 where each sector may include one or more customers 11. While the representation of FIG. 1 is two dimensional, it should be understood that sectors 13 can be stacked one over the other so as to provide service region discrimination in a third dimension. Communication services between any customer in system 100 and any location not directly communicating with a base station 10 can also be advantageously provided through wire and radio communication links at the base station which interconnect with the public telecommunications network.

Figure 2:
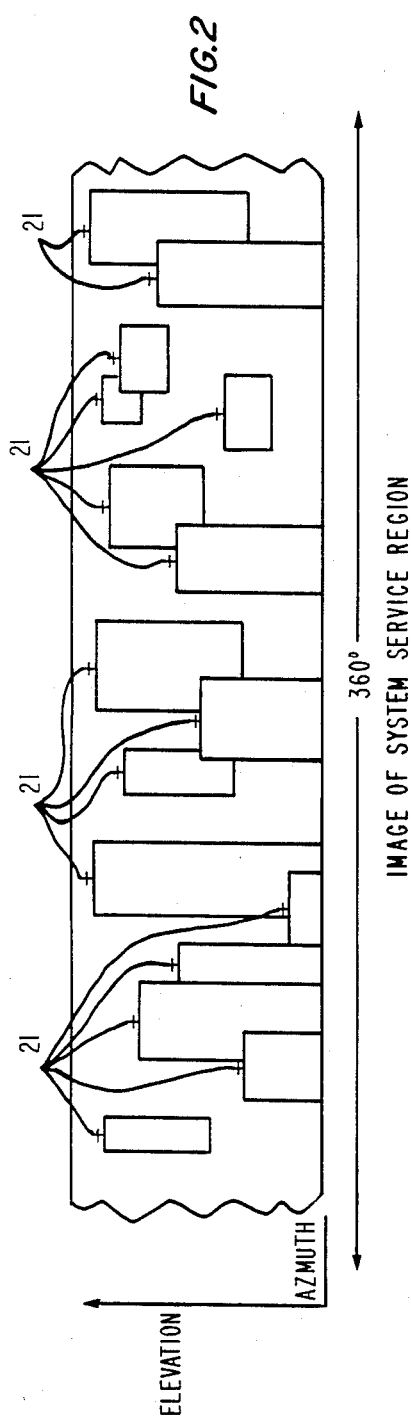
FIG. 2 is a panoramic representation of the system service region viewed from base station 10 of FIG. 1.

A panoramic view of the system service region as seen from base station 10 is shown in FIG. 2. The antenna 21 of each customer 11, represented by a +, is located at a particular azimuth and elevation. Communications services between customers 11 at any azimuth and elevation are routed through an antenna at base station 10 that provides a focussed M×N array of transmitting and a focussed M×N array of receiving radio spot beams. This use of focussed spot beams advantageously provides very high gain. As a result, communications services can be provided over a wide region with very low outage during rain attenuation even at the relatively uncongested higher frequency portions of the spectrum. In addition, high gain spot beams provide the power required of high data rate operation, and the high signal isolation between spot beams permits frequency reuse, thereby accommodating large traffic demands within a relatively narrow spectral allocation. Finally, the use of spot beams allows the use of inexpensive and small antennas which can be installed at a customer's rooftop or building window.

Each customer location lies within one transmit and one receive spot beam and, hence, the array quantities M and N are determined by the number of customers and their locations. As will be described hereinbelow, not all base station spot beams are simultaneously illuminated. Rather, the base station also includes appropriate switching apparatus which interconnects spot beam receiving and transmitting antenna ports through a pool of radio transmitters and receivers typically far smaller than the number of transmitting or receiving spot beam ports. Accordingly, the number of receiving and transmitting ports interconnected at any time is equal to the number of available radio receivers and transmitters or the total traffic demand, whichever is less. With the pooling of equipment, the radio receivers and transmitters are effectively shared among a greater number of spot beams resulting in higher equipment utilization, lower system costs, and less interbeam interference.

Figure 3:
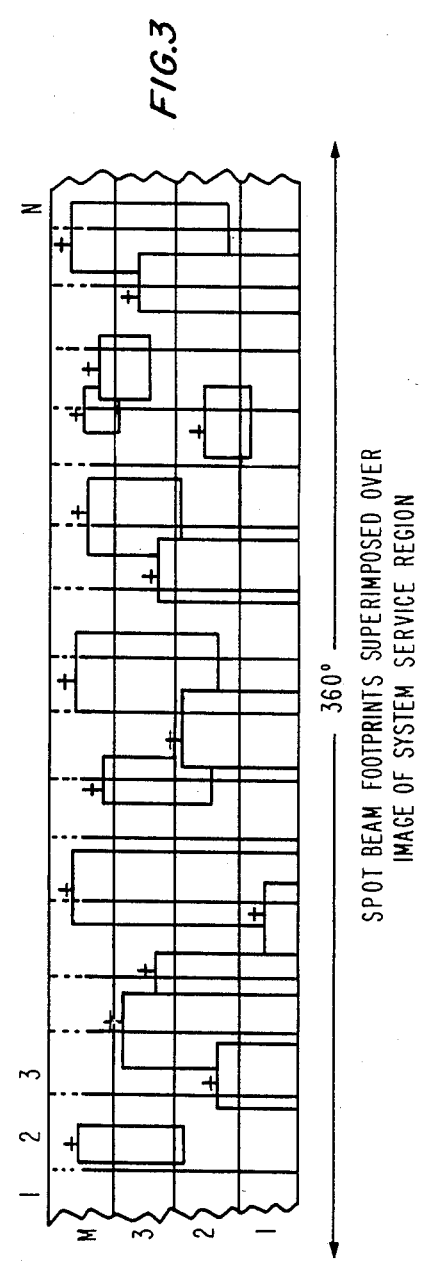
FIG. 3 is the panoramic representation of FIG. 2 with a grid representing the base station radio spot beam "footprints" superimposed thereon.

FIG. 3 shows an idealized representation of the $M \times N$ transmit or receive array of spot beams superimposed upon the panoramic view of FIG. 2. Each spot beam, idealized as a square, is associated with a port on the base station antenna. These ports may take the form of discrete horns feeding a large main reflector or may be realized with a phased array. Activation of a particular transmitting or receiving port at the base station is made by means of Time-Division-Multiple-Access (TDMA) wherein time is divided into a sequence of repetitive frames, with each frame divided into some number C of time slots. Assignment of one or more time slots to a particular transmit/receive pair of base station spot beams is made in response to customer requests and varies dynamically with the traffic demand for each customer. This selective activation of the transmit and receiver base station spot beams in accordance with a TDMA time slot effectively provides a "scanning" spot beam, i.e., the spot beam of energy into or out of the base station appears to be moving when, in reality, each feed or phased array element is fixed. Moreover, to provide the traffic capacity for a large number of customers, base station 10 can be equipped with multiple pairs of transmitting and receiving equipment to permit traffic assignment into a plurality of parallel TDMA sequences. As a result, a plurality of transmit and receive beams can be activated, if traffic demand dictates, at the same time.

Figure 4:
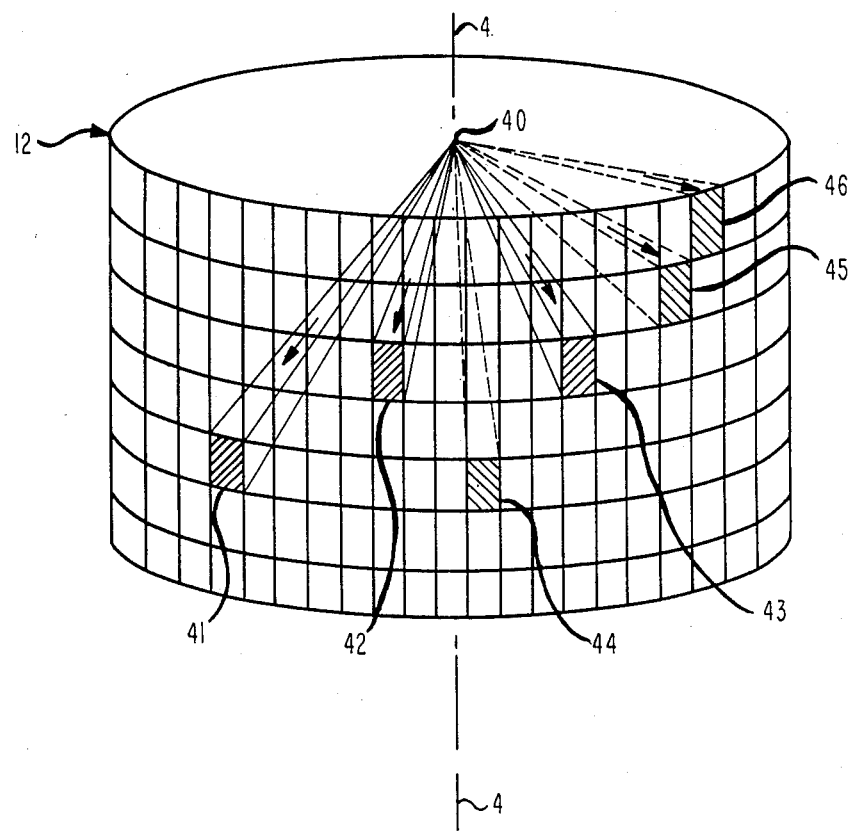
FIG. 4 is a pictorial representation illustrating the scanning spot beam concept utilized by base station 10 of FIG. 1.

Refer now to FIG. 4 which depicts the multiple scanning beam concept. Service region 12, blanketed by $M \times N$ arrays of transmitting and receiving base station spot beams, is represented by a solid cylinder. Each spot beam is represented by a pyramidal volume which extends from the base station 10, represented by point 40 on longitudinal axis 4—4, to the circumferential surface of the cylinder. At time $t=0$, base station 10 is simultaneously receiving three information channels from different customers 11 via focussed spot beams and/or from the public telecommunications network. This information is transmitted to the desired customers 11 via spot beams 41, 42 and 43. At $t=\Delta t$, i.e., 1 or more TDMA time slots later, information on three channels is received from customers 11 or from the public communications network and transmitted on spot beams 44, 45 and 46.

Figure 5:
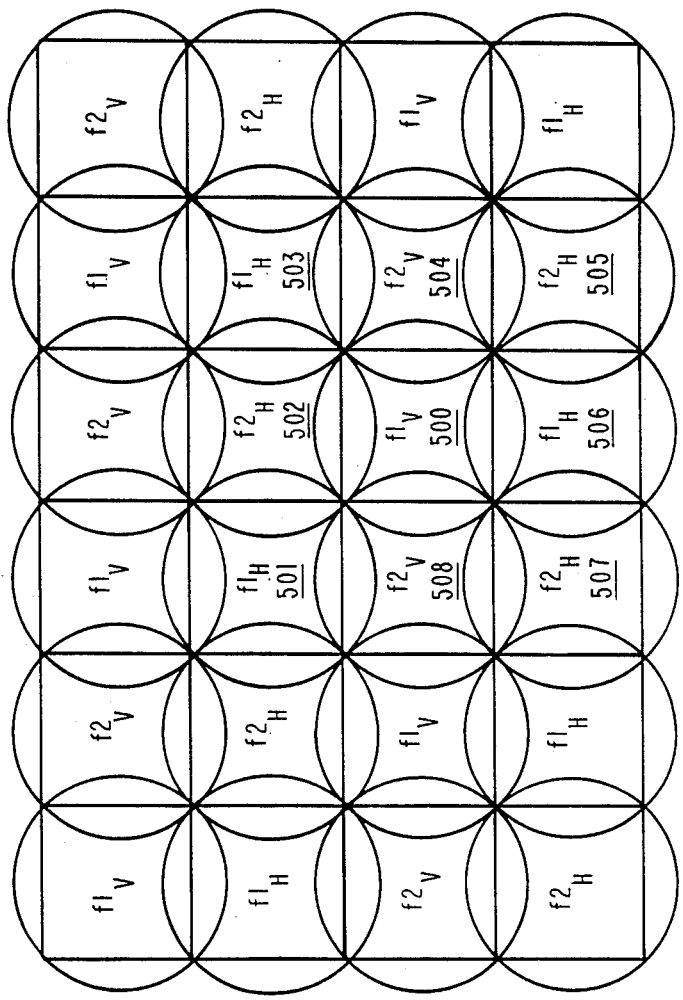
FIG. 5 is a representation of an illustrative frequency reuse arrangement for the spot beam footprints of FIG. 3.

The scanning beam concept can be advantageously combined with frequency reuse to further reduce beam-to-beam interference and permit more system customers within a limited frequency spectrum. Refer to FIG. 5 which shows the frequency reuse concept applied to a portion of either the transmit or receive $M \times N$ array of spot beams. Each spot beam is a circle which is superimposed upon a portion of the $M \times N$ grid of FIG. 3. The designations f1 and f2 refer to two distinct radio frequencies. The subscripts H and V refer to two orthogonal polarizations which, for illustrative purposes, are respectively designated as the horizontal and vertical. By alternating frequencies and staggering polarizations, the $M \times N$ array of transmitting or receiving spot beams can be generated wherein the spot beams immediately surrounding any selected spot beam do not utilize the same frequency and polarization as the selected spot beam. For example, in FIG. 5, spot beam 500 is a vertically polarized beam at frequency f1. None of the eight surrounding beams, designated as 501 through 508, have this polarization and frequency.

Figure 6:
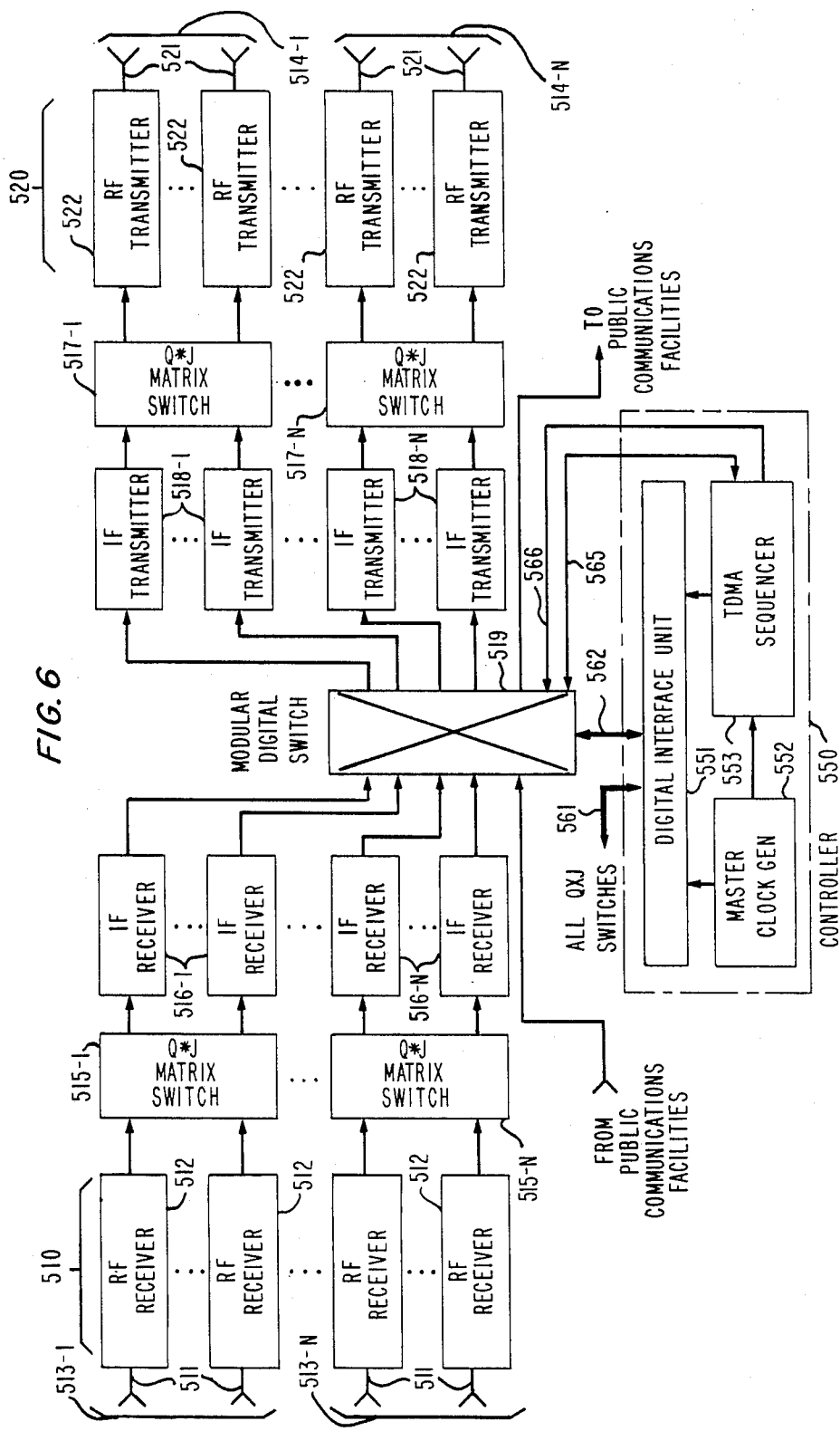
FIG. 6 is a block schematic diagram of the circuit architecture within base station 10 of FIG. 1.

Refer now to FIG. 6 which shows the architecture of base station 10. The $M \times N$ receiving ports 510 and the $M \times N$ transmitting ports 520 are each assigned a frequency and polarization to blanket the service region, as illustrated in FIG. 5. Each receiving port, including either a feedhorn or a particular phase setting of a plurality of phased array elements 511 serially connected to a radio frequency (RF) receiver 512, receives a radio spot beam having a preselected frequency and polarization. Similarly, each transmitting port 520 transmits a radio spot beam having a preselected frequency and polarization and includes an RF transmitter 522 which is serially connected to either a feedhorn or a particular phase setting of a plurality of phased array elements 521.

The receiving ports and transmitting ports are respectively partitioned into groups 513-1 through 513-N and 514-1 through 514-N. Rather than tailor the number of receiving ports in each of the groups 513-1 through 513-N and the number of transmitting ports in each of the groups 514-1 through 514-N so that each group of transmitting or receiving ports handles substantially the same volume of traffic, the receiving ports and transmitting ports are arbitrarily partitioned into groups each having a plurality of Q receiving ports or Q transmitting ports. Traffic balancing is then achieved by respectively assigning to a group of receiving or transmitting ports a number of intermediate frequency (IF) receivers and IF transmitters proportional to the traffic intensity handled by that group. Interconnection between the IF receivers and the receiving ports and between the IF transmitters and the transmitting ports is then provided via $Q \times J$ matrix switches, where J is $\leq Q$. The number of IF receivers associated with each receiving port group and the number of IF transmitters associated with each transmitting port group are, therefore, each limited to J. For the groups assigned fewer than J receivers or transmitters, some of the J matrix switch ports are simply unused. Typically, values for Q are 32 or 64 and for J, are 8.

There are several benefits to the above-described base station architecture. First, all $Q \times J$ matrix switches are identical and can be implemented via one common designated fabrication process. Second, this approach provides modularity at the base station, with the amount of equipment growing gracefully with the number of required radio spot beam positions and the overall service demand. What is avoided is the tedious process of moving receiving ports and transmitting ports from group to group to achieve load-balancing.

As shown in FIG. 6, each group of Q receiving ports 513-1 through 513-N is connected to a different one of the $Q \times J$ receive port matrix switches 515-1 through 515-N, with each receiving port in a group being connected to a different one of the Q switch terminals. All or a portion of the J switch terminals of each receive port matrix switch are connected to the j IF receivers, where j is = 1, 2 . . . J, associated with each receiving port group. These N groups of IF receivers are designated as 516-1 through 516-N. Each of the j IF receivers in any group is connected to a different one of the J switch matrix terminals with the J-j excess switch terminals, if any, being unused. Similarly, each group of Q transmitting ports 514-1 through 514-N is connected to a different one of the Q×J transmit port matrix switches 517-1 through 517-N with each transmitting port in a group being connected to a different one of the Q switch terminals. The switch terminals of each transmit port matrix switch are connected to a different one of the j IF transmitters, where j is 1, 2 . . . J, associated with each transmitting port group and the J-j excess terminals, if any, are unused. These N groups of IF transmitters are designated as 518-1 through 518-N.

to complete a communications channel from any receiving port to any transmitting port, the main switch 519 receives each of the IF receivers in groups 516-1 through 516-N on a different switch input terminal and each of the IF transmitters in groups 518-1 through 518-N on a different switch output terminal.

Operation of Q×J matrix switches 515-1 through 515-N, 517-1 through 517-N and main switch 519 in accordance with the TDMA frame assignments is governed by control signals on buses 561 and 562 generated by controller 550. These TDMA frame assignments are formed by TDMA sequencer 553 in response to signalling information from each customer 11. This signalling information, requesting interconnection from any given customer to any other during one or more TDMA time slots, is inserted through the receive port matrix switches, the main switch 519 and thence to sequencer 553 via lead 565 in dedicated TDMA time slots. Each customer has a different, preselected time slot after a preselected number of TDMA frames to transmit this signalling information to sequencer 553. Additionally, there are dedicated TDMA time slots associated with each customer 11 for transmitting signalling information from sequencer 553 to all the customers 11. This signalling information from sequencer 553 informs each customer of its assigned TDMA time slots and is routed from lead 566 through main switch 519 and transmit port matrix switches 517-1 through 517-N. This use of dedicated TDMA time slots for the transmission of signalling information is well-known and is described fully in U.S. Pat. No. 4,252,999 to Acampora et al., issued Feb. 24, 1981.

The TDMA frame sequences formed by sequencer 553 are transmitted to digital interface unit 551 where they are stored in an internal memory. Unit 551 then executes the stored TDMA time slot assignments by transmitting the appropriate control signals to main switch 519 and the receive port and transmit port matrix switches 516-1 through 516-N and 517-1 through 517-N via buses 562 and 561, respectively. Master clock generator 552 establishes a master clock signal which establishes the TDMA frame and time slot timing for sequencer 553 and digital interface unit 551. Additionally, as the signalling information from sequencer 553 to all the customers is synchronized with the master clock, the customers can synchronize their local checks from this signalling information and thereby provide a fully synchronized communications system.

As discussed hereinabove, the present communications system can be adapted to provide communications services between customers who communicate with the base station via radio spot beams as described hereinabove and customers who communicate with the base station on public telecommunications links. As shown, in FIG. 6 one or more receive ports and one or more transmit ports on main switch 519 can be connected to wire or radio public communications facilities. These facilities can then be treated as any other system customer and assigned TDMA time slots in accordance with interconnection requests received by TDMA sequencer 553.

The system traffic routed through base station 10 can be represented by a matrix T as shown:

$$T = \begin{bmatrix} t_{11} & t_{12} & \cdots & t_{1M} \\ t_{21} & t_{22} & \cdots & t_{2M} \\ \vdots & & & \\ t_{M1} & t_{M2} & \cdots & t_{MM} \end{bmatrix} \quad (1)$$

wherein the element $t_{ij}$ represents the sum of all traffic, in units of time slots, originating from a customer in spot beam i and destined for a customer in spot beam j, and M is the total number of spot beams containing customers. It is not necessary that the traffic matrix be symmetric, i.e., it is not required that $t_{ij} = t_{ji}$ or that $t_{ii} = 0$, but it is understood that $t_{ij} \geq 0$.

In order to assign this traffic to the time slots of each pair of IF receivers and IF transmitters, the following must be true:

$$\sum_{j=1}^{M} t_{ij} \leq C, \ 1 \leq i \leq M \quad (2)$$

$$\sum_{i=1}^{M} t_{ij} \leq C, \ 1 \leq j \leq M \quad (3)$$

$$\sum_{i=1}^{M} \sum_{j=1}^{M} t_{ij} \leq PC \quad (4)$$

where P is the total number of incoming or outgoing ports on switch 519. Equation (2) is a statement of the fact that the total traffic arising in any footprint cannot exceed the number of time slots in a frame (or else two or more base station receivers would need to be connected to the same footprint to accept this traffic, causing interference). Similarly, equation (3) is a statement of the fact that the total traffic destined for any footprint cannot exceed the number of time slots in the frame. Finally, equation (4) is a statement of the fact that the total offered traffic cannot exceed the total number of time slots in all P frames.

It can be shown that, provided equations (2)–(4) are satisfied, an assignment of traffic to the TDMA time slots can always be made. Let us define a diagonal of matrix T as a set of P nonzero entries, no two of which occupy the same row or column. Then, if equation (4) is satisfied with equality, a diagonal of T always exists, including elements from all rows and columns (if any) summing to C exactly. Let us pick one such diagonal. By construction, one unit of traffic from each element of a diagonal (P units of traffic total) may be assigned to the first time slot of the P TDMA frames without conflict. Having thus removed P units of traffic from the original matrix T, a new matrix T exists with the properties that (1) no row sum exceeds $C-1$, (2) no column sum exceeds $C-1$, and (3) the total traffic is less than $P(C-1)$. Thus, a second diagonal can be found covering all rows and columns (if any) of T summing to $(C-1)$; one unit of traffic from each element may be assigned to the second time slots of the frames. Proceeding in this manner, all traffic from T may be assigned without conflict.

The assignments are not unique and it may be possible to extract more than one unit of traffic per diagonal element at a time. This is desirable from a practical point of view as it minimizes the number of times the matrix switches and main switch have to be reconfigured during one TDMA frame period. To achieve this, it seems desirable to choose the diagonal elements from large elements in the rows and columns with the largest sums, if possible. The maximum traffic extractable, however, is $t = \min(t_1, t_2)$, i.e., t is equal to the smaller of $t_1$ or $t_2$, where $t_1$ = smallest element on the diagonal and $C - t_2$ is the largest row or column sum among the rows and columns not covered by the diagonals.

Figures 7, 8:
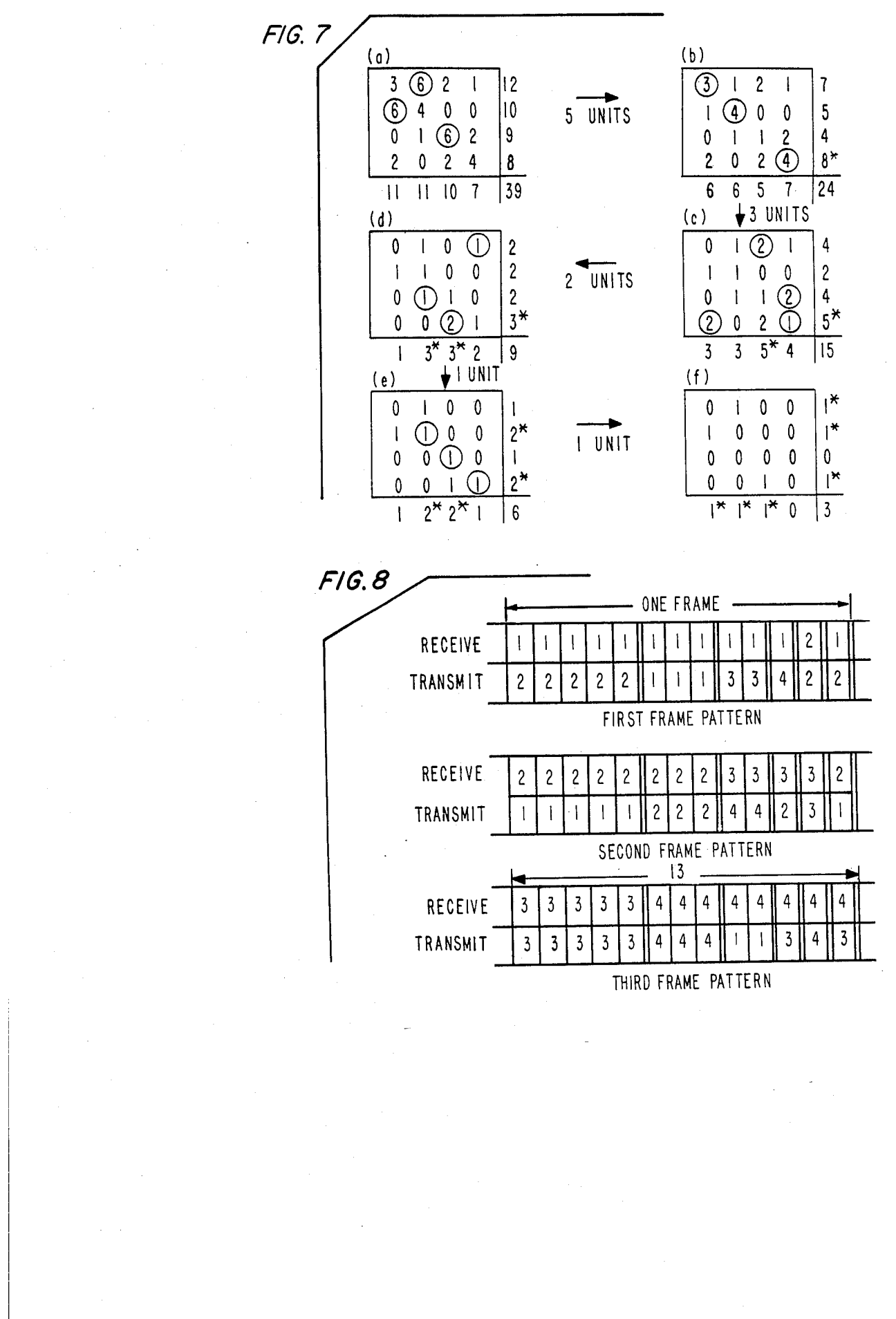

Refer now to FIG. 7 which shows the generation of three TDMA parallel frame sequences from a traffic matrix T. The diagonal elements chosen from matrix T are circled and the rows and columns which sum to the reduced value of C, if any, are marked with an asterisk. In FIG. 7, six units of traffic are available from the diagonals chosen in matrix (a) but only five units are selected therefrom since, as was stated hereinabove, the maximum traffic extractable is the smaller of either $t_1$, the smallest element on the diagonal, which equals six or $C - t_2$, the largest capacity of the row or column of the rows or columns not covered by the diagonal elements chosen, which equals $13 - 8$ or 5 and is here determinative. The corresponding traffic assignments to each of the three TDMA frames is also shown in FIG. 8.

Once these frame assignments are generated, the TDMA sequences must compare the assignments against the equipment pool of available IF receivers and IF transmitters which must be interconnected to fulfill these assignments. For example, referring to FIG. 6, the diagonal selected must cover the beams corresponding to the ports 513-1 a number of times equal to the number of IF receivers 516-1 connected to the ports via switch 515-1. The same must be true for all other receive ports 513-2 through 513-N and for all transmit ports 514-1 through 514-N. If the assignments made exceed the available equipment pool, the assignments made are disregarded and different diagonals are selected. It is typically easy to find the required diagonals. TDMA sequencer 553 can also advantageously store a list of undesirable traffic assignments for simultaneous time slots in the parallel TDMA frames. These undesirable traffic assignments would be based on apriori knowledge of the radio signal interference generated by the simultaneous transmission from certain selected customers. As with the available equipment pool, a comparison of the TDMA assignments and the undesirable traffic assignments would be made. If any of these undesirable traffic assignments appear in the TDMA frames, a different set of diagonals would be selected, corresponding to permissible time slot assignments. The different set of diagonals would include at least one diagonal not in the prior diagonal set. This selection of a different set of diagonals would continue until assignments result which do not exceed the available equipment and do not include undesirable traffic assignments.

It should, of course, be understood that the disclosed embodiment is merely illustrative and that alternate arrangements may be envisioned by those skilled in the art without departing from the spirit and scope of the present invention. For example, while the disclosed embodiment has been described in reference to radio signal and rf (radio frequency) receivers and transmitters, the present invention is not restricted in principle to such signals. The present invention can provide optical communications, e.g., infra-red signal transmission and reception, by merely changing the rf receivers and transmitters to receivers and transmitters which operate in this frequency band. Accordingly, the term "radio" and "rf" will be deemed to refer to electromagnetic radiation lying outside of the classical frequency range of such signals.

What is claimed is:

1. A base station for a terrestrial communications system, said base station comprising
   a plurality of signal receiving ports, each receiving port being disposed at a terrestrial location to receive energy at a predetermined receiving frequency from only a respective one of a plurality of regions forming a system service region, said predetermined receiving frequency being the same for more than one of said plurality of signal receiving ports,
   a plurality of signal transmitting ports, each transmitting port being disposed at said terrestrial location to transmit energy at a predetermined transmitting frequency to only an associated one of said plurality of regions forming said system service region, said predetermined transmitting frequency being the same for more than one of said plurality of signal transmitting ports,
   each region in said system service region being defined by a directional antenna pattern emanating from said base station, the totality of directional antenna patterns defining said system service region,
   at least one transmitter,
   at least one receiver, and
   means for respectively interconnecting said transmitter and receiver to a selected one of said signal transmitting and signal receiving ports during a time slot in a sequence of time slots forming a time division multiplexed frame.

2. The base station of claim 1 wherein said regions receiving energy at the same frequency are nonadjacent.

3. The base station of claim 2 wherein said regions transmitting energy at the same predetermined frequency are nonadjacent.

4. The base station of claim 1 wherein each of said regions transmits and receives energy having one of two frequencies.

5. The base station of claim 4 wherein each of said regions transmits and receives energy on one of two wave polarizations.

6. The base station of claim 1 wherein said interconnecting means comprises a matrix switch.

7. A communication subsystem comprising
   a plurality of signal receiving ports each disposed at a terrestrial location to receive electromagnetic energy from a different data source, each data source being in a respective one of a plurality of regions forming a system service region, a plurality of receivers, a plurality of signal transmitting ports, each disposed at said terrestrial location to transmit electromagnetic energy to a data destination, each data destination being in an associated one of said plurality of regions forming said system service region, each region in said system service region being defined by a directional antenna pattern emanating from said terrestrial location, the totality of directional antenna patterns defining said system service region, a plurality of transmitters, and means responsive to a supervisory signal for simultaneously connecting different ones of said receiving ports to different ones of said transmitting ports, said connecting means precluding the interconnection of receiving ports and transmitting ports whose simultaneous transmission of data would interfere with one another based on a predetermined interference pattern.

8. A base station for a terrestrial communications system, said base station comprising a plurality of signal receiving ports, each disposed at a terrestrial location to receive electromagnetic energy from a different region of a system service region and said receiving ports being arranged into receiving port groups wherein each group comprises a plurality of receiving ports, a plurality of signal transmitting ports, each disposed at said terrestrial location to transmit electromagnetic energy to said different regions of said system service region, and said transmitting ports being arranged into transmitting port groups wherein each transmitting port group comprises a plurality of transmitting ports, a plurality of transmitters arranged into groups with each transmitter group being associated with a different one of said transmitting port groups and each transmitter group having a number of transmitters which is not more than the number of transmitting ports in said associated transmitter port group, a plurality of radio receivers arranged into groups with each receiver group being associated with a different one of said receiving port groups and each group of radio receivers comprising a number of receivers which is not more than the number of receiving ports in said associated receiving port group, first switching means for interconnecting designated receiving ports to different receivers in said associated receiver group, second switching means for interconnecting designated transmitting ports to different transmitters in said associated transmitter group, and third switching means for interconnecting the interconnections formed by said first and second switching means so as to form designated communications paths through said base station.

9. The base station of claim 8 wherein adjacent ones of said regions receive energy at different frequencies.

10. The base station of claim 9 wherein adjacent ones of said regions transmit energy at different frequencies.

11. The base station of claim 8 wherein each of said regions transmits and receives energy having one of two frequencies.

12. The base station of claim 11 wherein each of said regions transmits and receives energy having one of two wave polarizations.

13. The base station of claim 8 wherein said first, second and third switching means each comprise a matrix switch.

14. The base station of claim 8 further including control means for directing the interconnection provided by said first, second and third switching means in accordance with time division multiple access time slot assignments.

15. The base station of claim 14 wherein the assignment of interconnection in simultaneous time slots precludes the assignment of interconnection which would interfere with one another based on a predetermined interference pattern.

* * * * *